(12) United States Patent
Bertz et al.

(10) Patent No.: US 12,524,634 B1
(45) Date of Patent: Jan. 13, 2026

(54) RADIO FREQUENCY IDENTITY (RFID) TAG READER DESIGNATION OF EXCLUDED TAG TRANSMISSION TIME SLOTS

(71) Applicant: T-Mobile Innovations LLC, Overland Park, KS (US)

(72) Inventors: Lyle T. Bertz, Lee's Summit, MO (US); Robert K. Butler, Overland Park, KS (US)

(73) Assignee: T-Mobile Innovations LLC

( * ) Notice: Subject to any disclaimer, the term of this patent is extended or adjusted under 35 U.S.C. 154(b) by 0 days.

(21) Appl. No.: 19/009,693

(22) Filed: Jan. 3, 2025

(51) Int. Cl.
  *G06K 7/10* (2006.01)
(52) U.S. Cl.
  CPC ................................. *G06K 7/10366* (2013.01)
(58) Field of Classification Search
  CPC .................................................. G06K 7/10366
  See application file for complete search history.

(56) References Cited

U.S. PATENT DOCUMENTS

2006/0208860 A1* 9/2006 Park .................... G06K 7/0008
340/10.5

* cited by examiner

*Primary Examiner* — Jamara A Franklin

(57) ABSTRACT

A radio frequency identity (RFID) tag reader. The reader comprises a radio transceiver; a non-transitory memory; a processor coupled to the radio transceiver and to the non-transitory memory; and an RFID tag reader application stored in the non-transitory memory. When executed by the processor, the application sends a message via the radio transceiver to a plurality of RFID tags indicating a first range of transmission time slots and indicating a second range of quiescent transmission time slots disposed within the range of transmission time slots, receives messages via the radio transceiver from the plurality of RFID tags during time slots that are outside the sub-range of quiescent transmission time slots, wherein the messages comprise information associated with items to which the plurality of RFID tags are affixed to, and transmits the information received from the plurality of RFID tags during the quiescent time slots.

20 Claims, 6 Drawing Sheets

RADIO FREQUENCY IDENTITY (RFID) TAG READER DESIGNATION OF EXCLUDED TAG TRANSMISSION TIME SLOTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio frequency identity (RFID) tags are passive semiconductor devices that may be affixed to various items for conducting electronic scans and inventory control functions. The RFID tags typically do not have self-contained electric power sources and harvest electrical power from ambient radio frequency fields. When powered and/or hailed by an RFID reader device, the RFID tags may broadcast information wirelessly via an antenna and radio transmitter.

When interrogating a large number of RFID tags in a common space (e.g., in a warehouse), an RFID tag reader may have difficulty sorting out the radio signals being emitted simultaneously by the RFID tags. In effect, the radio signals of different RFID tags may interfere with each other, preventing the RFID tag reader from properly receiving one or more of the radio signals and possibly preventing the RFID tag reader properly receiving any of the radio signals. Using a frame that is partitioned into a plurality of time slots can help reduce the overlap or collision of transmissions from RFID tags. For example, a slotted ALOHA protocol may be used. The RFID tag reader may initialize the RFID tags with a number of time slots. The RFID tags may each autonomously determine one of the time slots to use based on the RFID tag executing a random number generator algorithm. Each RFID tag may then transmit its information, after being prompted by the RFID reader, during a time slot that corresponds to the random number it generated. In this slotted ALOHA approach, RFID tag transmission collisions may still occur, but collisions are reduced in frequency.

SUMMARY

In an embodiment, a method of querying radio frequency identity (RFID) tags by a RFID tag reader is disclosed. The method comprises transmitting a radio power signal by the RFID tag reader, wherein the radio power signal is configured to provide power to RFID tags; after transmitting the radio power signal by the RFID tag reader, transmitting an initialization message by the RFID tag reader to a plurality of RFID tags, wherein the initialization message identifies a range of time slots during which the plurality of RFID tags are commanded to be quiescent; and after transmitting the initialization message by the RFID tag reader, receiving by the RFID tag reader information from the RFID tags during times slots different from the range of time slots during which the plurality of RFID tags are commanded to be quiescent.

In another embodiment, a radio frequency identity (RFID) tag reader is disclosed. The RFID tag reader comprises an antenna; a radio transceiver coupled to the antenna; a non-transitory memory; a processor coupled to the radio transceiver and to the non-transitory memory; and an RFID tag reader application stored in the non-transitory memory. When executed by the processor, the RFID tag reader application sends a message via the radio transceiver and via the antenna to a plurality of RFID tags indicating a first range of transmission time slots and indicating a second range of quiescent transmission time slots disposed within the range of transmission time slots, receives messages via the antenna and via the radio transceiver from the plurality of RFID tags during time slots that are outside the sub-range of quiescent transmission time slots, wherein the messages comprise information associated with items to which the plurality of RFID tags are affixed to, and transmits the information received from the plurality of RFID tags during the quiescent time slots.

In yet another embodiment, a method of querying radio frequency identity (RFID) tags by a plurality of RFID tag readers is disclosed. The method comprises transmitting a message by a first RFID tag reader to a second RFID tag reader, wherein the message defines a first range of time slots and defines a second range of quiescent time slots which identifies time slots during which the RFID tags are commanded to be quiescent, and wherein the second range of quiescent time slots are included within the first range of time slots; transmitting a first radio power signal by the first RFID tag reader, wherein the first radio power signal is configured to provide power to the RFID tags; and, after transmitting the first radio power signal, receiving first information from RFID tags by the first RFID tag reader during time slots of the first range of time slots that are different from the second range of time slots. The method further comprises transmitting a second radio power signal by the second RFID tag reader, wherein the second radio power signal is configured to provide power to the RFID tags; after transmitting the second radio power signal, receiving second information from RFID tags by the second RFID tag reader during time slots of the first range of time slots that are different from the second range of time slots; transmitting the first information by the first RFID tag reader during the second range of quiescent time slots to an inventory control application; and transmitting the second information by the second RFID tag reader during the second range of quiescent time slots to the inventory control application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
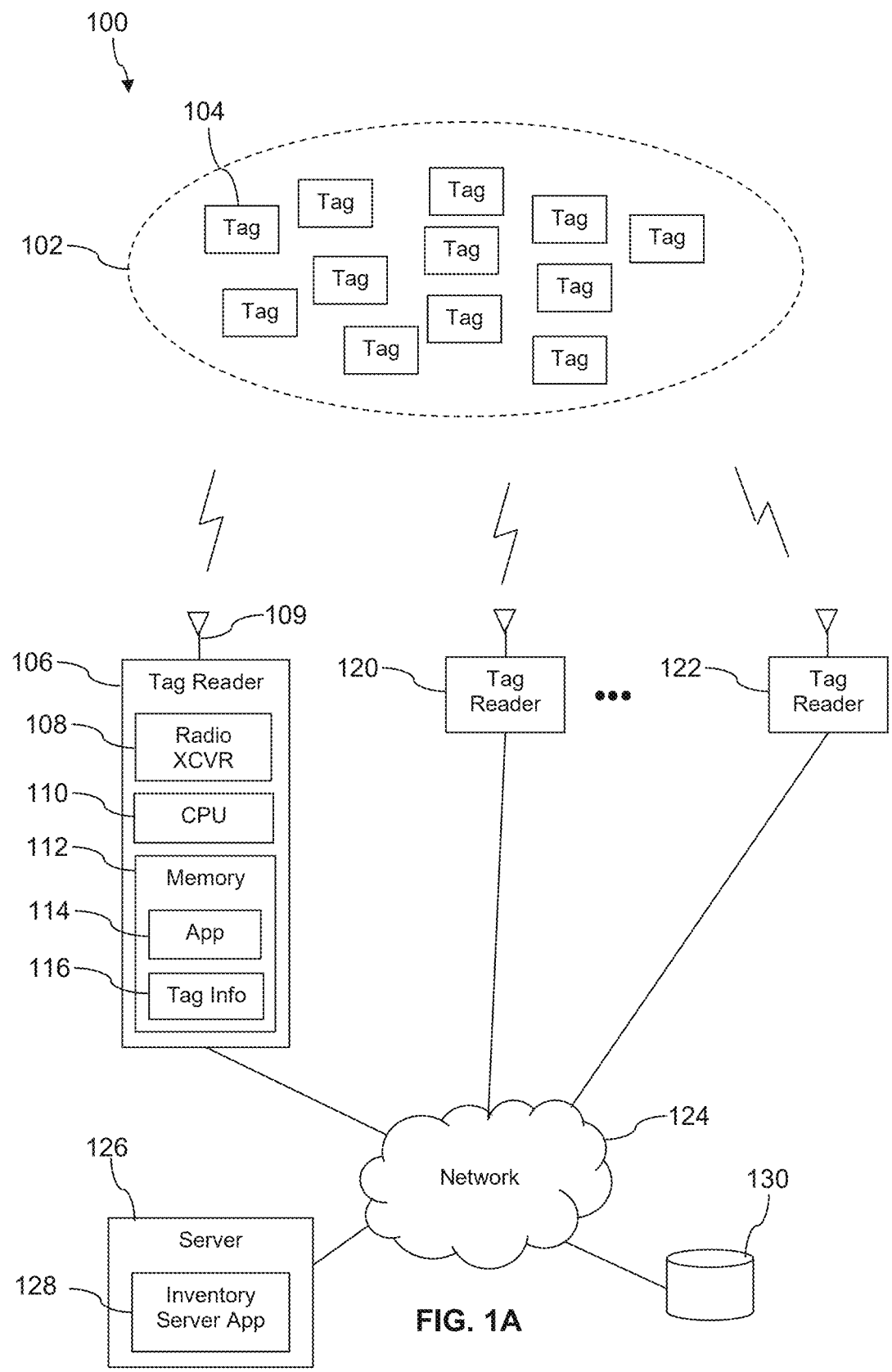
FIG. 1A is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A radio frequency identity (RFID) tag reading system is taught herein. The system promotes improved reading of RFID tags in a congested radio environment, reducing collisions among RFID tags attempting to respond to hailing from an RFID tag reader device by transmitting their information. In particular, the RFID tag reading system taught herein teaches initializing RFID tags with a range of time slot values and designating a contiguous sub-range of time slots within the range of time slot values that are defined to be quiescent time slots during which RFID tags are forbidden to transmit. For example, in an embodiment, the RFID tag reader may estimate that there are 1,000 RFID tags in an environment. The RFID reader may initialize the RFID tags with the range of time slots from time slot 1 to time slot 2000. Further, the RFID tag reader may identify a sub-range of time slots from time slot 501 to time slot 700 and command the RFID tags to be quiescent (e.g., refrain from transmitting) during the time slots 501 to 700. The RFID tags may then each autonomously identify time slots during which they will transmit, using a local random number generator, from the range of time slots 1 to 500 and 701 to 2000, excluding selection of a time slot in the range 501 to 700. This may result in transmission collisions occurring as some RFID tags attempt to transmit their information at the same time, but the RFID tags will not transmit during the quiescent time slots 501 to 700.

During time slots 501 to 700, the RFID tag reader may transmit information it has collected from the RFID tags during time slots 1 to 500 to a server, for example a server executing an inventory control application. This can reduce the burden on the RFID reader to store RFID tag information during a RFID tag reading cycle (e.g., during the full frame of time slots 1 through 2000 in this example). Thus, the RFID tag reader need not store information from all 1,000 RFID tags at one time but may be able to reduce this storage burden to some lower number of separate RFID tag information blocks.

In an environment where a plurality of RFID tag readers are employed, the RFID tag readers may employ the quiescent time slots both to unload their collected RFID tag information to the inventory control application executing on the server and to intercommunicate with and coordinate with each other. For example, the plurality of RFID tag readers may collaborate to define the quiescent time slots, whereby to assure enough time for each of the plurality of RFID tag readers to complete their uploads in a next frame of time slots. In an embodiment, one of the RFID tag readers initializes the plurality of RFID tag readers every frame and triggers and/or signals the start of the frame (e.g., delimits the start of the first time slot). Alternatively, in an embodiment, the RFID tags retain the initialization from the RFID tag reader until such time as another initialization is performed by one of the RFID tag reader. It is understood that the sub-range of time slots during which the RFID tags are to remain quiescent may be disposed at the start of the entire range of initialized time slots, in the middle of the entire range of initialized time slots (as in the example above), or at the end of the entire range of initialized time slots. In an embodiment, the plurality of RFID tag readers may intercommunicate during the quiescent time slots, in part, to attempt to correct a garbled RFID tag signal received from a given RFID tag by a first reader with a clean RFID tag signal received from the same given RFID tag by a second reader. In an embodiment, the RFID tag reader may indicate a plurality of sub-ranges of time slots during which the RFID tags are to remain quiescent. For example, the RFID tag reader may indicate the entire range of time slots as 1 to 2000, indicate a first quiescent sub-range of time slots 501 to 700 during which the RFID tags are to remain quiescent, and a second quiescent sub-range of time slots 1501 to 1700 during which the RFID tags are to remain quiescent.

The technological problem of managing communication between RFID tags and RFID tag readers in a congested radio environment can be solved or ameliorated by applying one or more of the particular technical solutions described above and hereinafter. By partitioning RFID tag responses into separate time slots, the risk of collisions among RFID tags transmitting their information at the same time is reduced. By designating a sub-range of time slots as quiescent time slots (e.g., time slots during which RFID tags are prohibited to transmit), RFID tag readers can off-load collected RFID tag information, reducing their burden of storing a greater amount of RFID tag information in their memory. Additionally, the designation of a sub-range of times slots as quiescent time slots allows RFID tag readers to intercommunicate with each other—to agree on a structure of the next frame of time slots and possibly to collaborate to correct errors one or more of the RFID tag readers may have experienced when receiving information from an RFID tag.

Figure 1B:
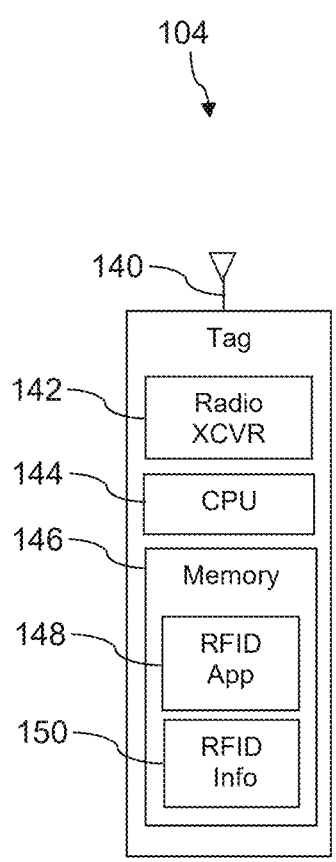
FIG. 1B is a block diagram of an RFID tag according to an embodiment of the disclosure.

Turning now to FIG. 1A and FIG. 1B, an RFID tag reading system 100 is described. In an embodiment, the system 100 comprises an environment 102 that comprises a plurality of RFID tags 104 affixed to articles of interest. In an embodiment, the articles of interest may be products and/or products inside packages, and the environment 102 may be a warehouse or a fulfillment center. The system further comprises a first RFID tag reader 106 that comprises a radio transceiver 108 communicatively coupled to one or more antenna 109, a processor 110, and a memory 112. A non-transitory portion of the memory 112 may store a tag reader application 114 and tag information 116. In an embodiment, the system 100 comprises a plurality of RFID tag readers, for example the first RFID tag reader 106, a second RFID tag reader 120, and a third RFID tag reader 122. The RFID tag readers 120, 122 may have components like those identified for the first RFID tag reader with reference to FIG. 1A. The RFID tag readers 106, 120, 122 may be considered to be part of the environment 102, for example part of a warehouse and/or part of a fulfillment center.

In an embodiment, the RFID tag readers 106, 120, 122 are communicatively coupled to a computer or server 126 via a network 124. Readers 106, 120, 122 may be communicatively coupled to the network 124 via a wired communication link, via a wireless communication link, or via a combination of one or more wired communication links and one or more wireless communication links. In an embodiment, one or more of the readers 106, 120, 122 may be connected to the network 124 via an Ethernet wired communication link. In an embodiment, the network 124 comprises one or more private networks, one or more public networks, or a combination thereof. The readers 106, 120, 122 may be considered to be computers. Computers are discussed further hereinafter with reference to FIG. 5. The computer 126 executes an inventory server application 128 that receives information about the RFID tags 104 from the readers 106, 120, 122 and processes that information.

In an embodiment, the readers 106, 120, 122 and/or the inventory server application 128 may store the information about the RFID tags 104 in a data store 130. The inventory server application 128 may then read the information about the RFID tags 104 from the data store 130, process the information about the RFID tags 104, and then store processing results back in the data store 130. The inventory server application 128 may further take action based on the information about the RFID tags 104 and/or based on the processed results. For example, the inventory server application 128 may dispatch orders to fulfillment center workers to fetch and ship items associated with one or more of the RFID tags 104 (e.g., packages containing products, where RFID tags 104 are affixed to the outside of the packages). For example, the inventory server application 128 may initiate an order of new product from a supplier to be shipped to the environment 102 (e.g., refill inventory stock as inventory depletes). For example, the inventory server application 128 may dispatch a robotic forklift to a loading dock to receive a pallet of products from a delivery truck and to move the pallet to an inventory storage location designated by the inventory server application 128. In an embodiment, the inventory server application 128 may be referred to as an inventory application and/or an inventory server application.

Further in FIG. 1B, each of the RFID tags 104 may comprise one or more antenna 140, a radio transceiver 142, a processor 144, and a memory 146. A non-transitory portion of the memory 146 comprises an RFID tag application 148 and RFID information 150. The RFID information 150 may comprise one or more of an identification of a product (e.g., an electronic product code), an original equipment manufacturer (OEM) of the product, a date of manufacture of the product, a receipt date (e.g., a date the product was received into the environment 102), and an electronic serial number of the product (e.g., a tag identity (TID)). It is to be noted that the identification of the product of a given RFID tag 104 may be shared with a plurality of other RFID tags 104 (e.g., there may be many instances of the same model of smart phone in a fulfillment center) while the electronic serial number of the given RFID tag 104 may be unique. In an embodiment, the RFID information 150 may comprise transaction information, such as transactions performed on a product associated with the RFID tag 104. These transactions may comprise moving the RFID tag 104 (and product to which the tag is affixed) within the environment 102, state changes of the RFID tag 104, and storage conditions experienced by the RFID tag 104 (and product to which the tag is affixed) such as temperature, humidity, irradiation by an ultraviolet source.

In an embodiment, the RFID tag 104 is a passive RFID tag 104, meaning it has no autonomous electric power source and receives electric power via its one or more antenna 140 from an ambient radio frequency electromagnetic field. The ambient radio frequency electromagnetic field may be generated by one or more of the readers 106, 120, 122 or by another power emitter within the environment 102. The RFID tag application 148 may be executed when the RFID tag 104 is powered by the ambient radio frequency electromagnetic field.

The readers 106, 120, 122 may periodically prompt the RFID tags 104 to transmit their information (e.g., product identity, OEM identity, date of manufacture, receipt date, and/or electronic serial number). The readers 106, 120, 122 may transmit a hailing signal to the RFID tags 104 to prompt them to transmit their information. In an embodiment, the readers 106, 120, 122 may transmit radio signals to and receive radio signals from the RFID tags 104. In an embodiment, the readers 106, 120, 122 may transmit radio signals to and receive radio signals from the RFID tags 104 in a cellular radio frequency band. It is understood that cellular radio frequency bands and/or segments of cellular radio frequency bands may be allocated to specific parties (e.g., cellular communication service providers such as AT&T, Verizon, T-Mobile, and others) and that these parties may be allowed to transmit radio signals at higher power levels in their allocated spectrum bands than is permitted in unlicensed radio spectrum bands, for example in the unlicensed industrial, scientific, and medical (ISM) radio spectrum bands. Transmitting radio signals at higher power levels may promote improved reception of these signals and may promote communicating at greater distances than would be possible at lower radio transmission power levels.

In an environment 102 where there are many RFID tags 104, it will be appreciated that if all the RFID tags 104 where to broadcast their information at the same time, the readers 106, 120, 122 could not separate out the information sent by different RFID tags 104 and essentially would receive nothing but garbled signals. To avoid such a cacophony of many RFID tags 104 broadcasting their information simultaneously, each of the RFID tags 104 may be configured to pick a random number within a delimited range and transmit their information during a time slot associated with the random number they picked.

Figure 2:
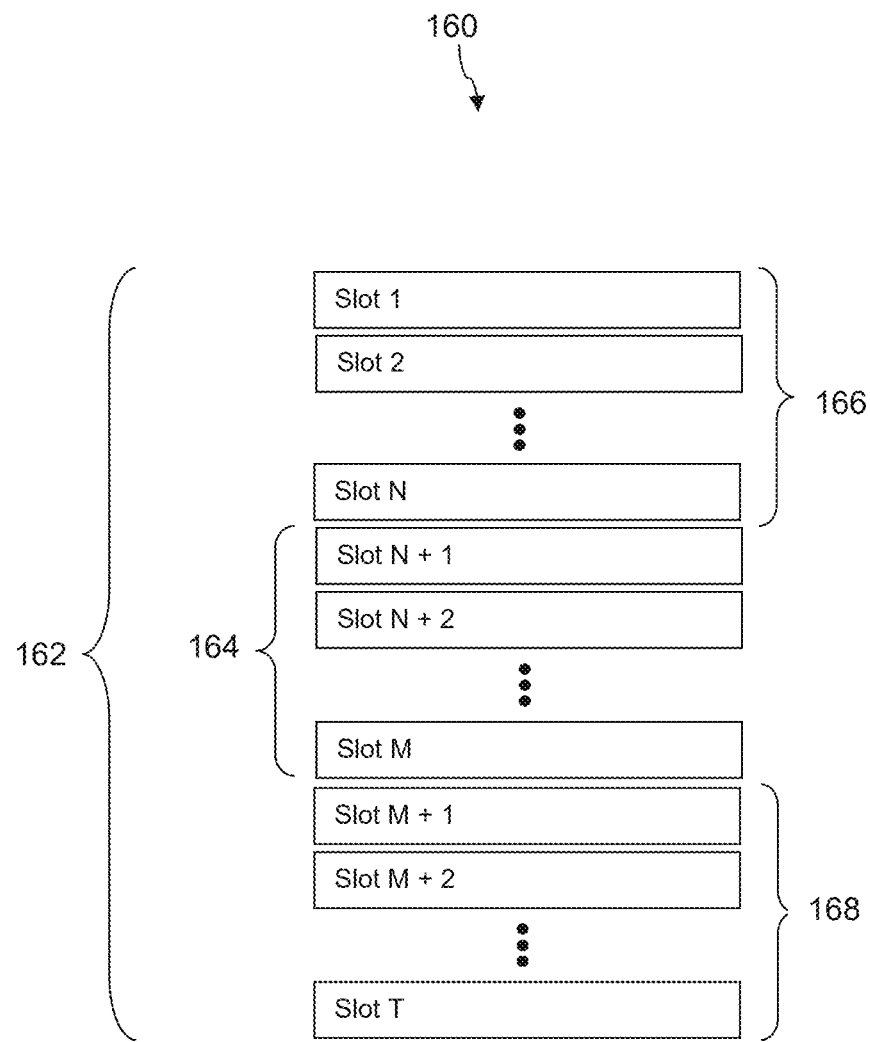
FIG. 2 is an illustration of RFID tag transmission time slots according to an embodiment of the disclosure.

Turning to FIG. 2, a frame 160 of time slots 162 is described. The time slots 162 may comprise time slot 1 through time slot T. To continue the example used above, a time slot N may be a time slot 500, a time slot M may be a time slot 700, and a time slot T may be a time slot 2000. During an RFID tag initialization session, one of the readers 106, 120, 122 may indicate to the RFID tags 104 that they are to pick a time slot based on determining a random number in the range of 1 to 2000. The range of time slots 1 through 2000 that map to this range of random numbers is labeled 162 in FIG. 2. Additionally, the one of the readers 106, 120, 122 may indicate to the RFID tags 104 that they are to exclude a first sub-range 164 of random numbers within the range 1 to 2000, for example, exclude random numbers in the sub-range 501 to 700. The RFID tag application 148 executing on each of the RFID tags 104 causes each RFID tag 104 to be quiescent during time slots associated with the sub-range 164. In some contexts, the sub-range 164 of time slots may be referred to as a quiescent range or quiescent sub-range of time slots. Thus, RFID tag applications 148 executing on the RFID tags 104 are configured by the initialization session to select a time slot in a second sub-range 166 from slot 1 to slot 499 or to select a time slot in a third sub-range 168 from slot 701 to slot 2000 and to avoid selecting a time slot in the first sub-range 164 from slot 501 to slot 700. In an embodiment, the initialization session may comprise one of the readers 106, 120, 122 transmitting an initialization message to all of the RFID tags 104 (e.g., a broadcast message not a message addressed to only one RFID tag 104).

In an embodiment, one of the readers 106, 120, 122 signals to the RFID tags 104 when each time slot starts. This may be referred to in some contexts as the reader 106, 120, 122 transmitting time slot start signals. Alternatively, the RFID tags 104 time the starts of the time slots autonomously using their processor 144 as a time keeper. When an RFID tag 104 has picked a random number in the second sub-range or the third sub-range of time slots and the start of that time slot is signaled by a reader 106, 120, 122 or determined by the RFID tag 104, the RFID tag 104 begins transmitting its information and completes this transmission before the end of that time slot. In some instances, two or more RFID tags 104 may pick the same time slot to transmit, creating a collision and making it difficult or impossible for a reader 106, 120, 122 to receive the transmitted information, but it is thought that the allocation of time slots as described herein reduces the general likelihood of such collisions.

As the RFID tags 104 transmit their information 150 to the readers 106, 120, 122, the readers 106, 120, 122 store the information in the tag information 116 area of their memory 112. For example, the readers 106, 120, 122 store information received during time slot 1 through time slot N of second sub-range 166 of time slots 162. During the first sub-range 164 of times slots 162, the readers 106, 120, 122 transmit or off-load the tag information 116 to the inventory server application 128 and/or to the data store 130. After transmitting or off-loading the tag information 116, the readers 106, 120, 122 may erase or clear its tag information 116 from its memory 112, thereby making room for more information thereafter. The readers 106, 120, 122 may also intercommunicate with each other to resolve information received from RFID tags 104 in a garbled form. For example, the reader 106 may receive a transmission from an RFID tag 104 that is garbled while the reader 120 may receive the same transmission from the same RFID tag 104 in a clean, ungarbled form. The reader 120 can share the ungarbled content of the information it received from the RFID tag 104 to the reader 106. Likewise, the reader 120 may receive a transmission from a different RFID tag 104 that is garbled while the reader 106 may receive the same transmission from the different RFID tag 104 in a clean, ungarbled form. The reader 106 can share the ungarbled content of the information it received from the different RFID tag 104 to the reader 120.

The readers 106, 120, 122 then store information received during time slot M+1 through time slot T of the third sub-range 168 of time slots 162. After the end of the time slots 162—after the completion of the frame 160, the readers 106, 120, 122 transmit or off-load the tag information 116 to the application 128 and/or to the data store 130. Off-loading tag information 116 mid-way through the frame 160 may support more timely processing of tag information by the application 128. Said in other words, the sending of a portion of tag information to the inventory server application 128 by the readers 106, 120, 122, and then receiving additional tag information by the readers 106, 120, 122 from RFID tags 104 while the inventory server application 128 begins processing the first tranche of tag information may promote more timely processing of tag information than if the inventory server application 128 waited until all tag information was collected from the RFID tags 104 by the readers 106, 120, 122 and then transmitted by the readers 106, 120, 122 to the inventory server application 128 and/or to the data store 130. While the second tranche of tag information is being collected by the readers 106, 120, 122 from the RFID tags 104, the inventory server application 128 can be processing the first tranche of tag information.

In an embodiment, the tag readers 106, 120, 122 may intercommunicate with each other during the time associated with the first sub-range of time slots 164, for example after tag information has been downloaded to the inventory server application 128 and/or to the data store 130 and before time slot M+1 starts. The readers 106, 120, 122 may intercommunicate with each other about how many time slots to allocate for the next frame 160 and/or when the next frame 160 should commence. The readers 106, 120, 122 may intercommunicate with each other about what time slots should be associated with the quiescent period (e.g., the time range during which RFID tags 104 are commanded to remain quiet) in the next frame 160. In an embodiment, the readers 106, 120, 122 may intercommunicate with each other to share information received from the RFID tags 104. For example, because the readers 106, 120, 122 may be located at different positions within the environment 102, different readers 106, 120, 122 may receive tag information from some of the RFID tags 104 and not receive tag information from others of the RFID tags 104. By sharing tag information among readers 104, 120, 122 during the quiescent period associated with the first sub-range 164 of time slots, each reader 104, 120, 122 may obtain a full set of tag information. Alternatively, readers 104, 120, 122 may be interested in different ones of the RFID tags 104, and by sharing information each reader 104, 120, 122 may obtain a full set of tag information for the RFID tags of interest to that specific reader 104, 120, 122.

In an embodiment, the frame 160 consisting of a plurality of time slots may be established according to a modified slotted ALOHA communication protocol, wherein the protocol has been adapted to inform the RFID tags 104 about a quiescent sub-range of time slots (e.g., the first sub-range 164 of time slots). While in the frame 160 illustrated and discussed above, the range of time slots 162 has only a single sub-range 164 associated with a quiescent time period, it is understood that the frame 160 may include two or more sub-ranges of quiescent time periods (e.g., sub-ranges of time slots during which RFID tags 104 are forbidden to transmit information). During two or more sub-ranges of quiescent time periods, different ones of the readers 106, 120, 122 may transmit their information to the inventory server application 128 and/or the data store 130.

Figure 3:
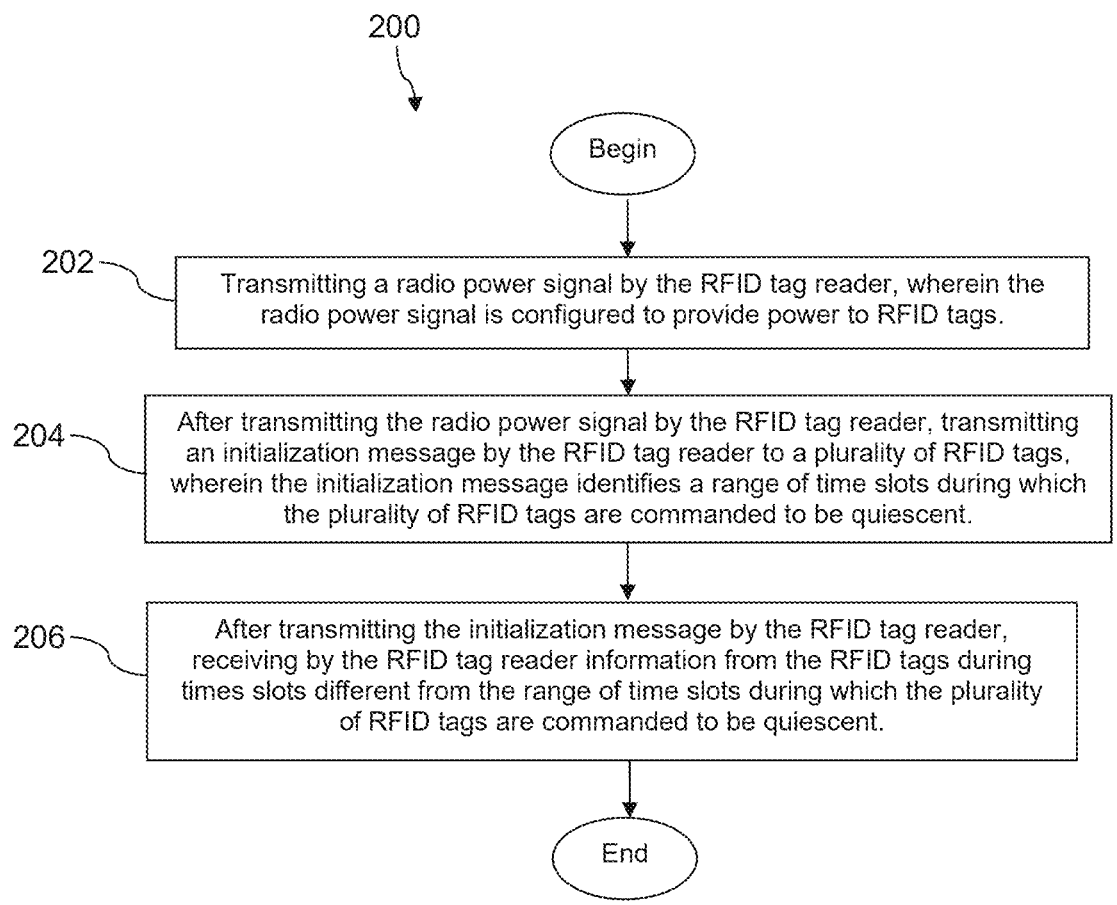
FIG. 3 is a flow chart of a method according to an embodiment of the disclosure.

Turning now to FIG. 3, a method 200 is described. In an embodiment, the method 200 is a method of querying radio frequency identity (RFID) tags by a RFID tag reader. At block 202, the method 200 comprises transmitting a radio power signal by the RFID tag reader, wherein the radio power signal is configured to provide power to RFID tags. In an embodiment, the RFID tag reader is located in a warehouse. In an embodiment, the RFID tag reader is located in a fulfillment center.

At block 204, the method 200 comprises, after transmitting the radio power signal by the RFID tag reader, transmitting an initialization message by the RFID tag reader to a plurality of RFID tags, wherein the initialization message identifies a range of time slots during which the plurality of RFID tags are commanded to be quiescent. At block 206, the method 200 comprises, after transmitting the initialization message by the RFID tag reader, receiving by the RFID tag reader information from the RFID tags during times slots different from the range of time slots during which the plurality of RFID tags are commanded to be quiescent. In an embodiment, the RFID tag reader implements a modified slotted ALOHA protocol. In an embodiment, the method 200 further comprises estimating a number of the RFID tags by the RFID tag reader; and determining a number of time slots that is greater than the estimated number of RFID tags by the RFID tag reader, wherein the initialization message identifies the number of time slots. In an embodiment, the method 200 further comprises each RFID tag of the plurality of RFID tags generating a random number based on the number of time slots that is greater than the estimated number of RFID tags that is not in the range of time slots during which the plurality of RFID tags are commanded to be quiescent; and each of RFID tag of the plurality of RFID tags transmitting information during a time slot associated with the random number generated by the RFID tag. In an embodiment, the method 200 further comprises the RFID tag reader transmitting the information received from the RFID tags to an inventory application executing on a computer system, whereby an inventory of products to which the RFID tags are affixed is managed by the computer system.

Figure 4:
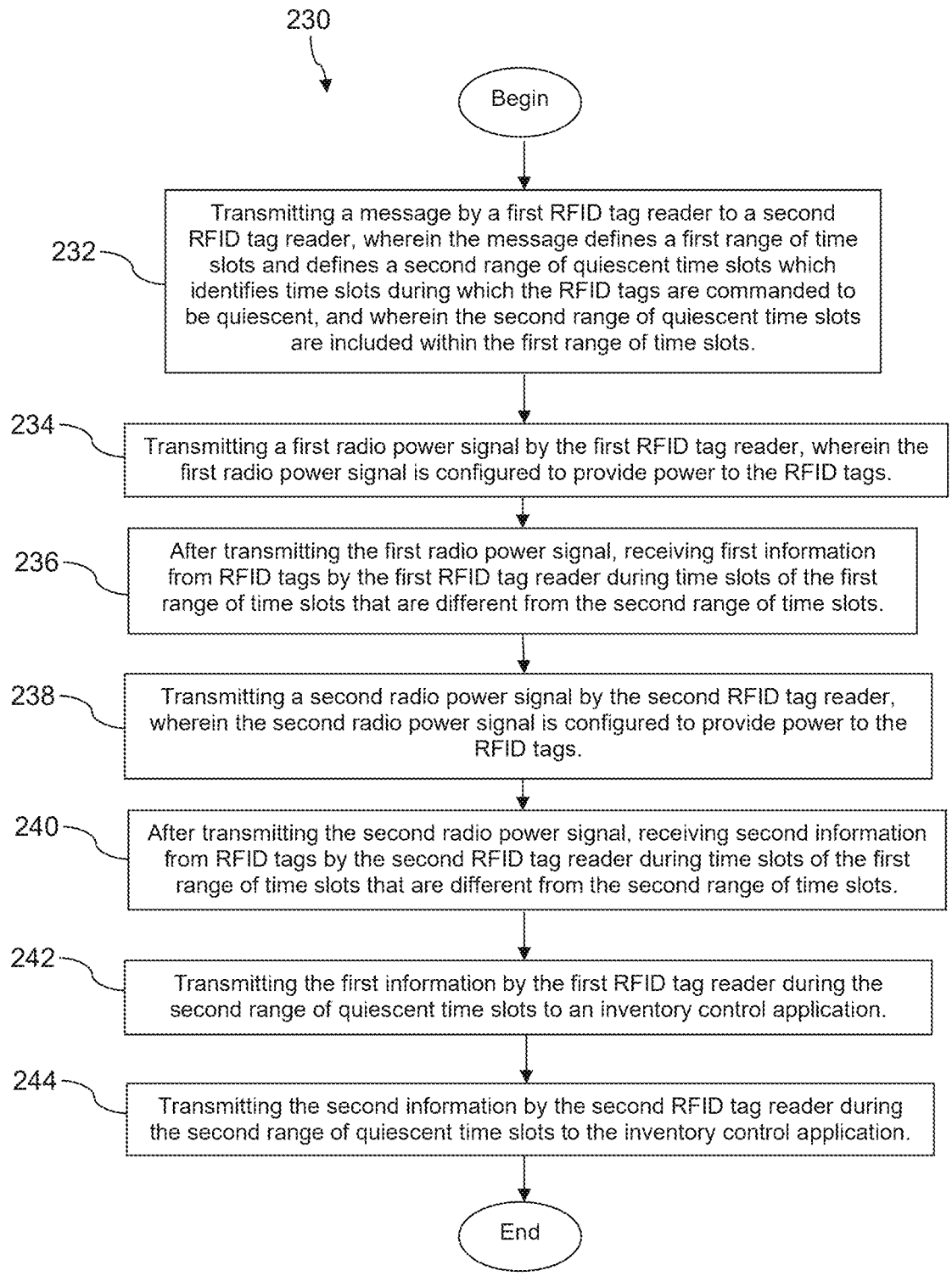
FIG. 4 is a flow chart of another method according to an embodiment of the disclosure.

Turning now to FIG. 4, a method 230 is described. In an embodiment, the method 230 is a method of querying radio frequency identity (RFID) tags by a plurality of RFID tag readers. In an embodiment, the RFID tags are affixed to inventory items. In an embodiment, the inventory items comprise smart phones, laptop computers, notebook computers, tablet computers, and/or Internet of Things (IoT) devices. At block 232, the method 230 comprises transmitting a message by a first RFID tag reader to a second RFID tag reader, wherein the message defines a first range of time slots and defines a second range of quiescent time slots which identifies time slots during which the RFID tags are commanded to be quiescent, and wherein the second range of quiescent time slots are included within the first range of time slots.

At block 234, the method 230 comprises transmitting a first radio power signal by the first RFID tag reader, wherein the first radio power signal is configured to provide power to the RFID tags. In an embodiment, the first radio power signal is transmitted in a cellular radio frequency band. At block 236, the method 230 comprises, after transmitting the first radio power signal, receiving first information from RFID tags by the first RFID tag reader during time slots of the first range of time slots that are different from the second range of time slots.

At block 238, the method 230 comprises transmitting a second radio power signal by the second RFID tag reader, wherein the second radio power signal is configured to provide power to the RFID tags. At block 240, the method 230 comprises, after transmitting the second radio power signal, receiving second information from RFID tags by the second RFID tag reader during time slots of the first range of time slots that are different from the second range of time slots.

At block 242, the method 230 comprises transmitting the first information by the first RFID tag reader during the second range of quiescent time slots to an inventory control application. In an embodiment, the first RFID tag reader transmits the first information to the inventory control application via a wired communication link. In an embodiment, the wired communication link is an Ethernet wired communication link.

At block 244, the method 230 comprises transmitting the second information by the second RFID tag reader during the second range of quiescent time slots to the inventory control application.

Figure 5:
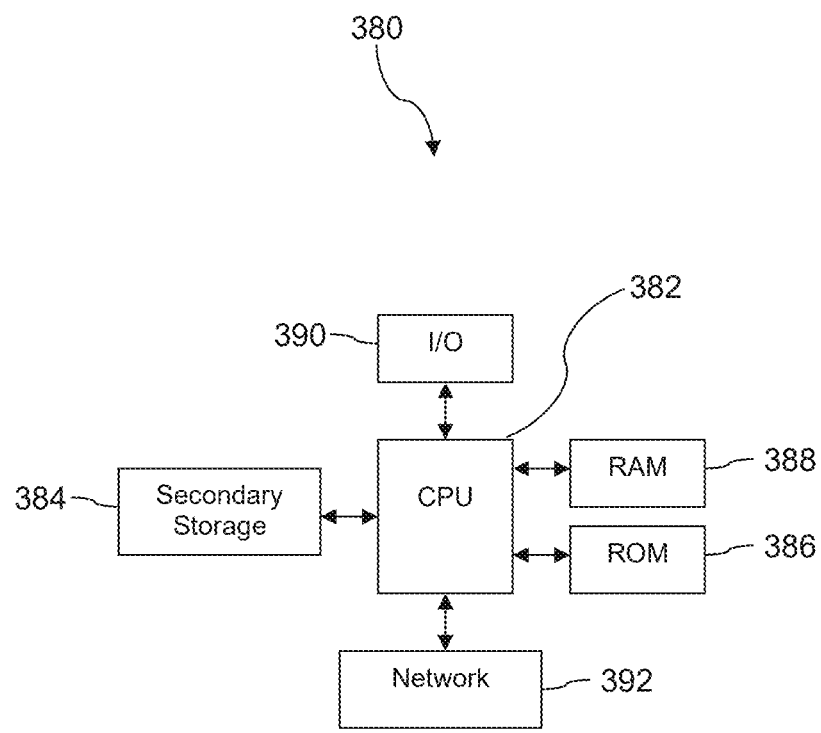
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392.

While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of querying radio frequency identity (RFID) tags by a RFID tag reader, comprising:
    transmitting a radio power signal by the RFID tag reader, wherein the radio power signal is configured to provide power to RFID tags;
    after transmitting the radio power signal by the RFID tag reader, transmitting an initialization message by the RFID tag reader to a plurality of RFID tags, wherein the initialization message identifies a range of time slots during which the plurality of RFID tags are commanded to be quiescent; and
    after transmitting the initialization message by the RFID tag reader, receiving by the RFID tag reader information from the RFID tags during time slots different from the range of time slots during which the plurality of RFID tags are commanded to be quiescent.

2. The method of claim 1, wherein the RFID tag reader implements a modified slotted ALOHA protocol.

3. The method of claim 1, further comprising:
    estimating a number of the purality of RFID tags by the RFID tag reader; and
    determining a number of time slots that is greater than the estimated number of the plurality of RFID tags by the RFID tag reader, wherein the initialization message identifies the number of time slots.

4. The method of claim 3, further comprising:
    each RFID tag of the plurality of RFID tags generating a random number based on the number of time slots that is greater than the estimated number of the plurality of RFID tags that is not in the range of time slots during which the plurality of RFID tags are commanded to be quiescent; and
    each of RFID tag of the plurality of RFID tags transmitting information during a time slot associated with the random number generated by the RFID tag.

5. The method of claim 1, wherein the RFID tag reader is located in a warehouse.

6. The method of claim 1, wherein the RFID tag reader is located in a fulfillment center.

7. The method of claim 1, further comprising the RFID tag reader transmitting the information received from the plurality of RFID tags to an inventory application executing on a computer system, whereby an inventory of products to which the plurality of RFID tags are affixed is managed by the computer system.

8. A radio frequency identity (RFID) tag reader, comprising:
    an antenna;
    a radio transceiver coupled to the antenna;
    a non-transitory memory;
    a processor coupled to the radio transceiver and to the non-transitory memory; and
    an RFID tag reader application stored in the non-transitory memory that, when executed by the processor:
        sends a message via the radio transceiver and via the antenna to a plurality of RFID tags indicating a first range of transmission time slots and indicating a second range of transmission time slots disposed within the first range of transmission time slots, wherein the second range of transmission time slots is indicated to be a quiescent range of time slots during which RFID tags are to avoid transmitting,
        receives messages via the antenna and via the radio transceiver from the plurality of RFID tags during time slots that are outside the second range of quiescent transmission time slots, wherein the messages comprise information associated with items to which the plurality of RFID tags are affixed to, and
        transmits the information received from the plurality of RFID tags during the second range of time slots.

9. The RFID tag reader of claim 8, wherein the radio transceiver is configured to communicate with the plurality of RFID tags in a cellular communication radio frequency band.

10. The RFID tag reader of claim 8, wherein the RFID tag reader application transmits time slot start signals to the plurality of RFID tags.

11. The RFID tag reader of claim 8, wherein the RFID tag reader intercommunicates with other RFID tag readers to determine the second range of time slots.

12. The RFID tag reader of claim 8, wherein the RFID tag reader transmits a radio frequency power signal that is configured to provide power to the plurality of RFID tags.

13. The RFID tag reader of claim 8, wherein the message sent to the plurality of RFID tags indicates a third range of time slots disposed within the first range of transmission time slots, wherein the third range of transmission time slots is indicated to be a second quiescent range of time slots during which the plurality of RFID tags are to avoid transmitting, wherein the third range of transmission time slots is different from the second range of transmission time slots.

14. The RFID tag reader of claim 8, wherein the RFID tag reader application transmits the information received from the plurality of RFID tags to an inventory control application executing on a computer system.

15. A method of querying radio frequency identity (RFID) tags by a plurality of RFID tag readers, comprising:
- transmitting a message by a first RFID tag reader to a second RFID tag reader, wherein the message defines a first range of time slots and defines a second range of quiescent time slots which identifies time slots during which the plurality of RFID tags are commanded to be quiescent, and wherein the second range of quiescent time slots are included within the first range of time slots;
- transmitting a first radio power signal by the first RFID tag reader, wherein the first radio power signal is configured to provide power to the plurality of RFID tags;
- after transmitting the first radio power signal, receiving first information from RFID tags by the first RFID tag reader during time slots of the first range of time slots that are different from the second range of time slots;
- transmitting a second radio power signal by the second RFID tag reader, wherein the second radio power signal is configured to provide power to the plurality of RFID tags;
- after transmitting the second radio power signal, receiving second information from RFID tags by the second RFID tag reader during time slots of the first range of time slots that are different from the second range of time slots;
- transmitting the first information by the first RFID tag reader during the second range of quiescent time slots to an inventory control application; and
- transmitting the second information by the second RFID tag reader during the second range of quiescent time slots to the inventory control application.

16. The method of claim 15, wherein the first RFID tag reader transmits the first information to the inventory control application via a wired communication link.

17. The method of claim 16, wherein the wired communication link is an Ethernet wired communication link.

18. The method of claim 15, wherein the plurality of RFID tags are affixed to inventory items.

19. The method of claim 18, wherein the inventory items comprise one of smart phones, laptop computers, tablet computers, notebook computers, or Internet of Things (IoT) devices.

20. The method of claim 15, wherein the first radio power signal is transmitted in a cellular radio frequency band.

* * * * *